(12) United States Patent
Eppink

(10) Patent No.: US 11,542,987 B2
(45) Date of Patent: Jan. 3, 2023

(54) TORQUE TRANSFER SYSTEM

(71) Applicant: Schlumberger Technology Corporation, Sugar Land, TX (US)

(72) Inventor: Jay M. Eppink, Spring, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 124 days.

(21) Appl. No.: 17/095,877

(22) Filed: Nov. 12, 2020

(65) Prior Publication Data

US 2021/0148410 A1     May 20, 2021

Related U.S. Application Data

(60) Provisional application No. 62/935,163, filed on Nov. 14, 2019.

(51) Int. Cl.
| | |
|---|---|
| *F16D 1/06* | (2006.01) |
| *F16D 1/10* | (2006.01) |
| *E21B 17/043* | (2006.01) |

(52) U.S. Cl.
CPC ............. *F16D 1/06* (2013.01); *E21B 17/043* (2013.01); *F16D 2001/103* (2013.01)

(58) Field of Classification Search
CPC ............... E21B 17/042; E21B 17/0423; E21B 17/0426; E21B 17/043; E21B 17/046; F16B 7/182; F16D 1/02; F16D 1/06; F16D 2001/062; F16D 2001/103; Y10T 403/56; Y10T 403/5733; Y10T 403/5741; Y10T 403/5746

USPC ......... 403/299, 305, 306, 307; 464/53, 153, 464/182

See application file for complete search history.

(56) References Cited

U.S. PATENT DOCUMENTS

| | | | | |
|---|---|---|---|---|
| 2,234,957 | A * | 3/1941 | Boynton | E21B 17/043 |
| | | | | 285/148.7 |
| 5,048,871 | A * | 9/1991 | Pfeiffer | E21B 17/043 |
| | | | | 403/118 |
| 5,794,985 | A * | 8/1998 | Mallis | E21B 17/0423 |
| | | | | 285/330 |
| 6,514,003 | B2 * | 2/2003 | Horikawa | F16D 1/06 |
| | | | | 464/182 |
| 6,915,865 | B2 * | 7/2005 | Boyd | E21B 17/046 |
| | | | | 464/163 |

(Continued)

FOREIGN PATENT DOCUMENTS

| | | | | |
|---|---|---|---|---|
| EP | 0060549 A1 * | 9/1982 | ........... | E21B 17/043 |
| EP | 0132742 A1 | 2/1985 | | |

(Continued)

OTHER PUBLICATIONS

International Search Report and Written Opinion issued in International Patent application PCT/US2020/060111 dated Mar. 9, 2021, 9 pages.

(Continued)

*Primary Examiner* — Josh Skroupa

(57) ABSTRACT

A torque transfer system includes a drive shaft threaded into a housing. The drive shaft includes shaft splines. The housing includes housing splines. A sleeve includes inner splines and outer splines. The inner splines are configured to interlock with the shaft splines and the outer splines are configured to interlock with the housing splines.

17 Claims, 9 Drawing Sheets

(56) References Cited

U.S. PATENT DOCUMENTS

| | | | |
|---|---|---|---|
| 6,942,254 B2* | 9/2005 | Cartsensen | F16B 7/182 |
| | | | 403/41 |
| 7,104,345 B2 | 9/2006 | Eppink | |
| 8,439,406 B2* | 5/2013 | Slack | E21B 17/043 |
| | | | 285/333 |
| 9,470,231 B2* | 10/2016 | Diemer | F04D 13/06 |
| 10,745,117 B2* | 8/2020 | Garcia | F16D 1/06 |
| 2005/0279513 A1 | 12/2005 | Eppink | |
| 2007/0074874 A1 | 4/2007 | Richardson | |
| 2011/0180273 A1* | 7/2011 | Hugh | E21B 17/0426 |
| | | | 285/330 |
| 2016/0032664 A1 | 2/2016 | Greening et al. | |

FOREIGN PATENT DOCUMENTS

| | | | | |
|---|---|---|---|---|
| WO | WO-9832946 A1 * | 7/1998 | | E21B 17/043 |
| WO | 2008050150 A1 | 5/2008 | | |
| WO | WO-2008124855 A2 * | 10/2008 | | E21B 17/043 |

OTHER PUBLICATIONS

International Preliminary Report on Patentability issued in International Patent application PCT/US2020/060111 dated May 27, 2022, 8 pages.

* cited by examiner

TORQUE TRANSFER SYSTEM

CROSS-REFERENCE TO RELATED APPLICATIONS

This application claims the benefit of, and priority to, U.S. Patent Application No. 62/935,163 filed on Nov. 14, 2019, which is incorporated herein by this reference in its entirety.

BACKGROUND OF THE DISCLOSURE

Downhole drilling systems may include one or more rotating sections. Some downhole drilling systems may include a downhole motor (e.g., a mud motor). Downhole motors may include positive displacement motors such as progressive cavity motors. A progressive cavity motor may include a rotor that rotates in response to a fluid flow. The rotation of the motor may be transferred to a drive shaft, which may, in turn, rotate a downhole tool, such as a drill bit. A connection between the rotor and the drive shaft may transfer the torque to the drive shaft.

SUMMARY

In some embodiments, a torque transfer system comprises a drive shaft having a shaft spline. A housing has a housing spline, with the housing being configured to receive the drive shaft. A sleeve includes an outer spline and an inner spline. The outer spline is configured to interlock with the housing spline and the inner spline is configured to interlock with the shaft spline.

In other embodiments, a torque transfer system comprises a housing including a housing spline. A sleeve includes an outer spline and an inner spline. The housing spline is configured to mechanically interlock with the outer spline, and the housing is configured to receive a drive shaft internal to the sleeve.

In yet other embodiments, a method of manufacturing a torque transfer system comprises threading a drive shaft into a first end of a housing. A sleeve is inserted into a second end of the housing, the sleeve including an inner spline and an outer spline. The inner spline interlocks with a shaft spline on the drive shaft, and the outer spline interlocks with a housing spline on the housing.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 2-1 is a representation of a cross-sectional view of a torque transfer system, according to at least one embodiment of the present disclosure;

FIG. 2-2 is an exploded view of the torque transfer system of FIG. 2-1;

FIG. 4-1 is a representation of a partially assembled torque transfer system, according to at least one embodiment of the present disclosure;

FIG. 4-2 is a representation of a transverse cross-sectional view of the torque transfer system of FIG. 4-1;

DETAILED DESCRIPTION

This disclosure generally relates to devices, systems, and methods for torque transfer systems. In some embodiments, a torque transfer system is configured to transfer torque to a drive shaft. The torque transfer system may include a housing, a shaft, and a sleeve. The shaft may include shaft splines on an outer surface of the shaft, the housing may include housing splines on an inner surface of the housing, and the sleeve may include inner splines on an inner surface of the sleeve and outer splines on an outer surface of the sleeve. The sleeve may be configured to interlock with both the shaft splines and the housing splines. Splines provide a strong resistance to torque. Therefore, by connecting the drive shaft to the housing with the sleeve, the torsional resistance of the torque transfer system may be increased. This may allow a greater torque to be applied to the drive shaft. The drive shaft may be connected to a drill bit. Increasing the torque transferred to the drive shaft may increase the torque applied by the drill bit to the formation, which may increase the rate of penetration of the drilling assembly.

Figure 1:
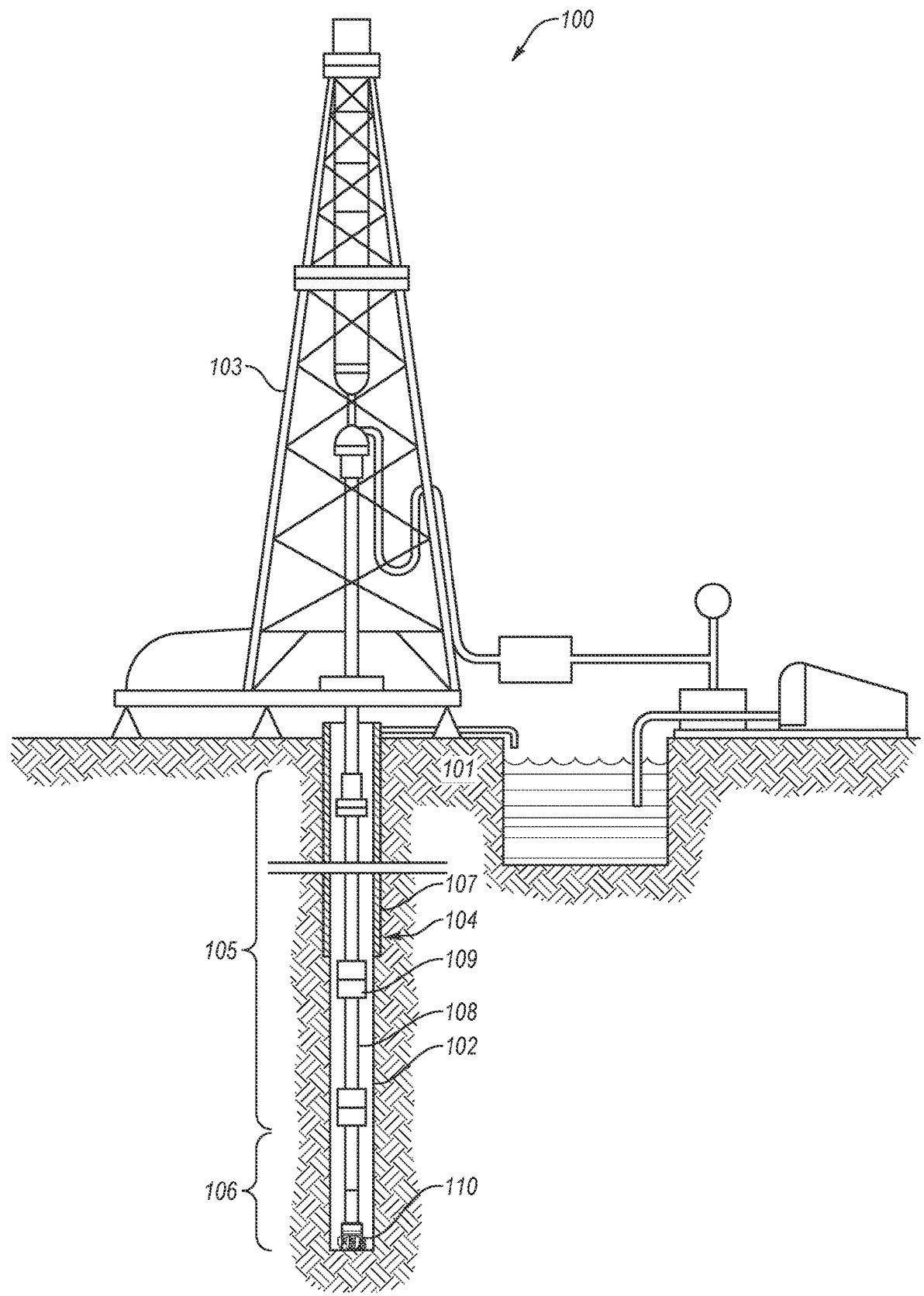
FIG. 1 is a representation of a drilling system, according to at least one embodiment of the present disclosure.

FIG. 1 shows one example of a drilling system 100 for drilling an earth formation 101 to form a wellbore 102. The drilling system 100 includes a drill rig 103 used to turn a drilling tool assembly 104 which extends downward into the wellbore 102. The drilling tool assembly 104 may include a drill string 105, a bottomhole assembly ("BHA") 106, and a bit 110, attached to the downhole end of drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some embodiments, the drill string 105 may further include additional components such as subs, pup joints, etc. The drill pipe 108 provides a hydraulic passage through which drilling fluid is pumped from the surface. The drilling fluid discharges through selected-size nozzles, jets, or other orifices in the bit 110 for the purposes of cooling the bit 110 and cutting structures thereon, and for lifting cuttings out of the wellbore 102 as it is being drilled.

The BHA 106 may include the bit 110 or other components. An example BHA 106 may include additional or other components (e.g., coupled between to the drill string 105 and the bit 110). Examples of additional BHA components include drill collars, stabilizers, measurement-while-drilling ("MWD") tools, logging-while-drilling ("LWD") tools, downhole motors, underreamers, section mills, hydraulic disconnects, jars, vibration or dampening tools, other components, or combinations of the foregoing. The BHA 106 may further include a rotary steerable system (RSS). The RSS may include directional drilling tools that change a direction of the bit 110, and thereby the trajectory of the wellbore. At least a portion of the RSS may maintain a geostationary position relative to an absolute reference frame, such as gravity, magnetic north, and/or true north. Using measurements obtained with the geostationary position, the RSS may locate the bit 110, change the course of the bit 110, and direct the directional drilling tools on a projected trajectory.

In general, the drilling system 100 may include other drilling components and accessories, such as special valves (e.g., kelly cocks, blowout preventers, and safety valves). Additional components included in the drilling system 100 may be considered a part of the drilling tool assembly 104, the drill string 105, or a part of the BHA 106 depending on their locations in the drilling system 100.

The bit 110 in the BHA 106 may be any type of bit suitable for degrading downhole materials. For instance, the bit 110 may be a drill bit suitable for drilling the earth formation 101. Example types of drill bits used for drilling earth formations are fixed-cutter or drag bits. In other embodiments, the bit 110 may be a mill used for removing metal, composite, elastomer, other materials downhole, or combinations thereof. For instance, the bit 110 may be used with a whipstock to mill into casing 107 lining the wellbore 102. The bit 110 may also be a junk mill used to mill away tools, plugs, cement, other materials within the wellbore 102, or combinations thereof. Swarf or other cuttings formed by use of a mill may be lifted to surface or may be allowed to fall downhole.

Figures 1, 2:
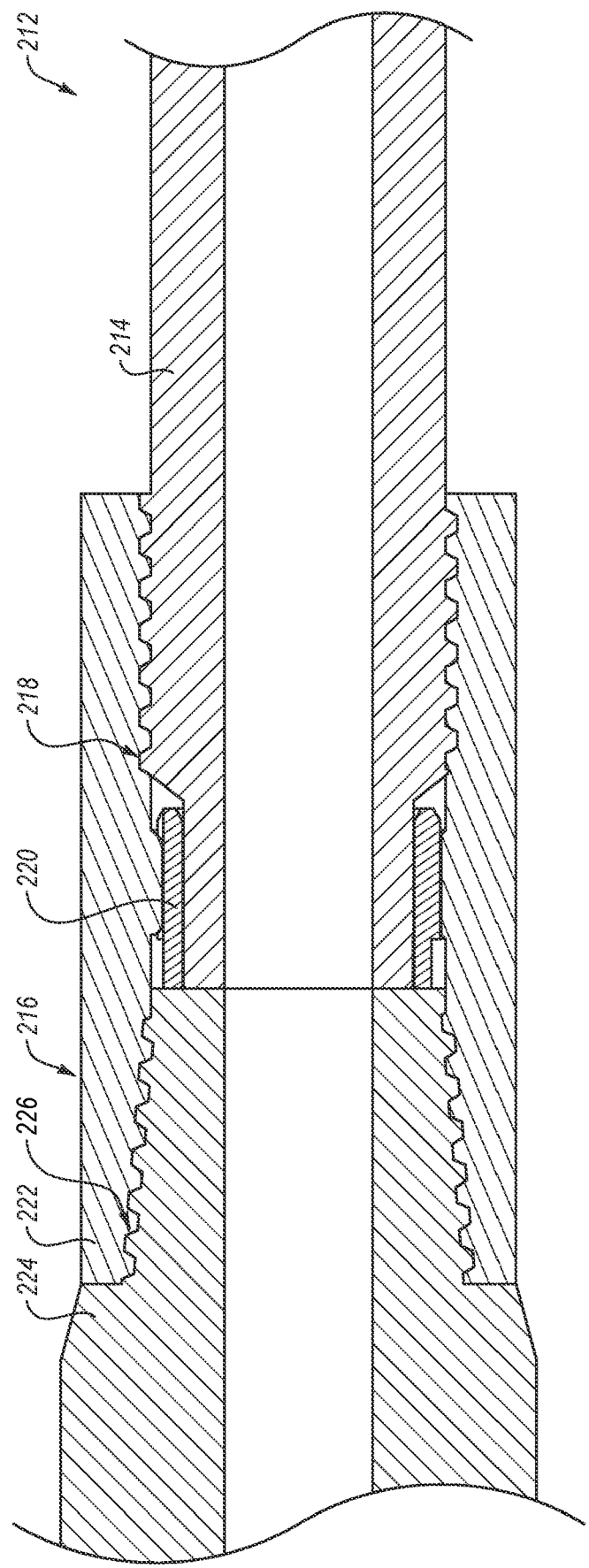
Figure 2:
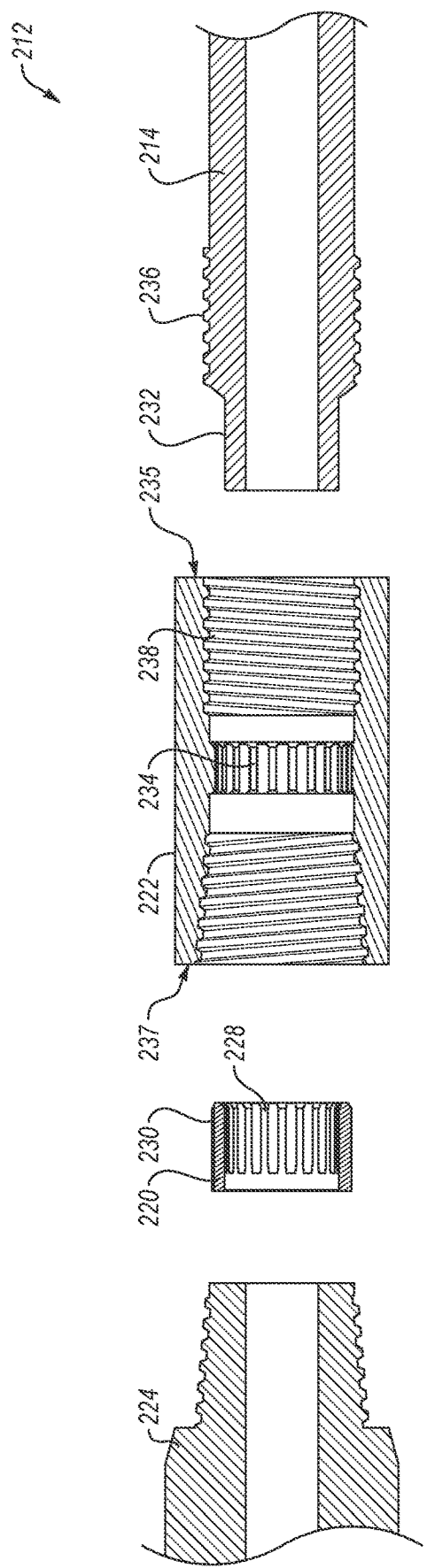

FIG. 2-1 is a representation of a torque transfer system 212, according to at least one embodiment of the present disclosure. The torque transfer system 212 shown includes a drive shaft 214. The drive shaft 214 is connected to a housing 216. In the embodiment shown, the drive shaft 214 is connected to the housing 216 with a threaded connection 218. A sleeve 220 is placed between the drive shaft 214 and the housing 216. The sleeve 220 may be configured to transfer torque from the housing 216 to the drive shaft 214.

In the embodiment shown, the housing 216 includes a first housing 222 (e.g., a downhole housing) and a second housing 224 (e.g., an uphole housing). The second housing 224 may be configured to connect to a downhole motor (such as a mud motor, including a positive displacement motor) through a constant velocity (CV) joint. Thus, as the downhole motor generates torque, the torque may be transferred to the second housing 224. The second housing 224 may be connected to the first housing with a housing threaded connection 226.

FIG. 2-2 is an exploded longitudinal sectional view of the torque transfer system 212 of FIG. 2-1. As may be seen, the sleeve 220 includes a set of inner splines 228 and a set of outer splines 230. In some embodiments, the inner splines 228 may include one or more protrusions from an inner surface of the sleeve 220. In some embodiments, the inner splines 228 may be formed by machining grooves into the inner surface of the sleeve 220, with the splines being the protruding material between the grooves. In some embodiments, the inner splines 228 and/or the outer splines 230 may be cast into the sleeve 220, the sleeve 220 may be extruded with the splines, the sleeve 220 may be additively manufactured with the splines, and combinations thereof. The inner splines 228 and/or the outer splines 230 may be parallel to a longitudinal axis of the torque transfer system 212.

The inner splines 228 may be configured to interlock with a set of shaft splines 232 on the drive shaft 214. In some embodiments, the shaft splines 232 may be protrusions from the outer surface of the drive shaft 214. In some embodiments, the shaft splines 232 may be formed by machining grooves into the outer surface of the drive shaft 214, and the shaft splines 232 may be the protruding material between the machined grooves. In some embodiments, to interlock the inner splines 228 with the shaft splines 232, the protruding teeth of the inner splines 228 may extend into the groove between teeth of the shaft splines 232, and the protruding teeth of the shaft splines 232 may extend into the groove between protruding teeth of the inner splines 228. Thus, as the sleeve 220 rotates, the protruding teeth of the shaft splines 232 may contact the protruding teeth of the inner splines 228, and the protruding teeth of the inner splines 228 may contact the protruding teeth of the shaft splines 232. In some embodiments, the shaft splines 232 may be cast into the drive shaft 214, the drive shaft 214 may be extruded with the shaft splines 232, the drive shaft 214 may be additively manufactured with the shaft splines 232, and combinations thereof. The shaft splines 232 may be parallel to the longitudinal axis of the torque transfer system 212.

The outer splines 230 may be configured to interlock with a set of housing splines 234 on the first housing 222. In some embodiments, the housing splines 234 may be protrusions from the inner surface of the first housing 222. In some embodiments, the housing splines 234 may be formed by machining grooves into the inner surface of the first housing 222, and the housing splines 234 may be the protruding material between the machined grooves. In some embodiments, to interlock the outer splines 230 with the housing splines 234, the protruding teeth of the outer splines 230 may extend into the groove between teeth of the housing splines 234, and the protruding teeth of the housing splines 234 may extend into the groove between protruding teeth of the outer splines 230. Thus, as the sleeve 220 rotates, one or more of the protruding teeth of the housing splines 234 may contact the protruding teeth of the outer splines 230, and one or more of the protruding teeth of the outer splines 230 may contact the protruding teeth of the housing splines 234. In some embodiments, the housing splines 234 may be cast into the first housing 222, the first housing 222 may be extruded with the housing splines 234, the first housing 222 may be additively manufactured with the housing splines 234, and combinations thereof. The housing splines 234 may be parallel to the longitudinal axis of the torque transfer system 212.

In some embodiments, as a torque is applied between the first housing 222 and the sleeve 220, the torque may be transferred between the housing splines 234 and the outer splines 230. The torque may also be transferred between the inner splines 228 and the shaft splines 232. This may cause the drive shaft 214 and the first housing 222 to rotate together.

To assemble the torque transfer system 212 into the assembled view shown in FIG. 2-1, the drive shaft 214 may be threaded into the first housing 222. The drive shaft 214 may be inserted into a first end 235 of the first housing 222. The drive shaft 214 includes a set of shaft threads 236 which may then be threaded into housing threads 238 on the first housing 222. After the drive shaft 214 has been inserted and threaded into the first end 235 of the first housing 222, the sleeve 220 may then be inserted into a second end 237 of the first housing 222. The sleeve 220 may then be rotated until the inner splines 228 interlock with the shaft splines 232 and the outer splines 230 interlock with the housing splines. The second housing 224 may then be installed on the first housing 222. For example, the second housing 224 may be threaded onto the first housing with a threaded connection.

Figure 3:
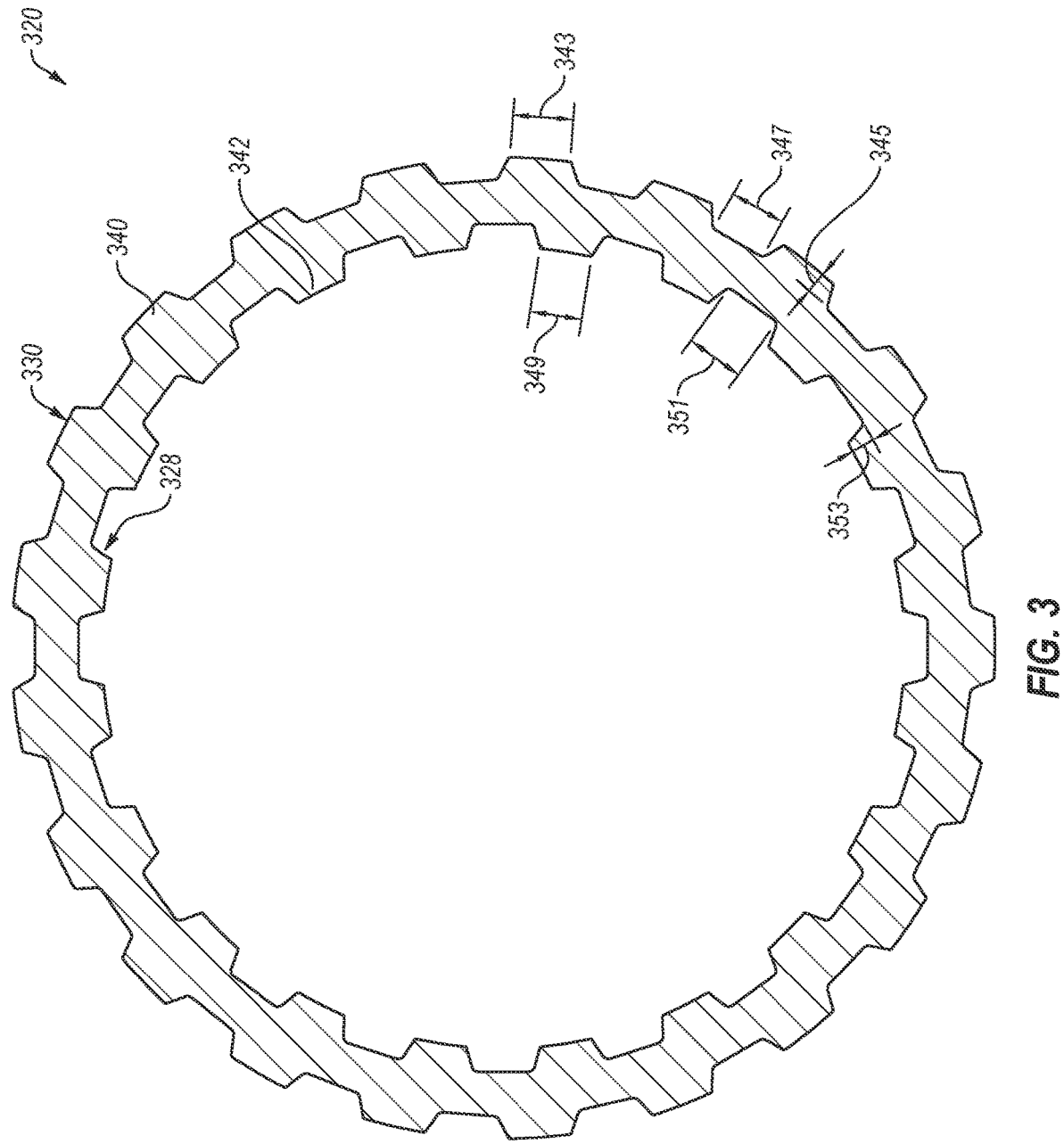
FIG. 3 is a representation of a cross-sectional view of the sleeve of FIG. 2-1, according to at least one embodiment of the present disclosure.

FIG. 3 is a representation of a transverse cross-sectional view of a sleeve 320, according to at least one embodiment of the present disclosure. The sleeve 320 includes a set of inner splines 328 and a set of outer splines 330. The inner splines 328 include inner spline teeth 340 and the outer splines include outer spline teeth 342.

The inner splines 328 have a quantity of inner spline teeth 340 in the inner splines 328. In some embodiments, the quantity of inner spline teeth 340 may be in a range having an upper value, a lower value, or upper and lower values including any of 1, 2, 3, 4, 5, 6, 7, 8, 9, 10, 12, 14, 16, 18, 20, 25, 30, or any value therebetween. For example, the quantity of inner spline teeth 340 may be greater than 1. In another example, the quantity of inner spline teeth 340 may be less than 30. In yet other examples, the quantity of inner spline teeth 340 may be any value in a range between 1 and 30. In some embodiments, the quantity of inner spline teeth 340 may be greater than 30. In some embodiments, it may be critical that the quantity of inner spline teeth 340 is greater than 20 to provide sufficient rotational positions for installation of the sleeve 320.

In some embodiments, the inner splines include an inner tooth density. The inner tooth density may be a number of teeth per inch of radius of the inner splines. In some embodiments, the inner tooth density may be in a range having an upper value, a lower value, or upper and lower values including any of 5 per in. radius, 6 per in. radius, 7 per in. radius, 8 per in. radius, 9 per in. radius, 10 per in. radius, 11 per in. radius, 12 per in. radius, 13 per in. radius, 14 per in. radius, 15 per in. radius, 16 per in. radius, 17 per in. radius, 18 per in. radius, 19 per in. radius, 20 per in. radius, 21 per in. radius, 22 per in. radius, 23 per in. radius, 24 per in. radius, 25 per in. radius, or any value therebetween. For example, the inner tooth density may be greater than 5 per in. radius. In another example, the inner tooth density may be less than 25 per in. radius. In yet other examples, the inner tooth density may be any value in a range between 5 and 25 per in. radius. In some embodiments, it may be critical that the inner tooth density is between 10 and 12 per in. radius to provide sufficient rotational positions for installation of the sleeve 320.

The outer splines 330 has a quantity of outer spline 342 teeth. In some embodiments, the quantity of outer spline 342 teeth may be in a range having an upper value, a lower value, or upper and lower values including any of 1, 2, 3, 4, 5, 6, 7, 8, 9, 10, 12, 14, 16, 18, 20, 21, 25, 30, or any value therebetween. For example, the quantity of outer spline 342 teeth may be greater than 1. In another example, the quantity of outer spline 342 teeth may be less than 30. In yet other examples, the quantity of outer spline 342 teeth may be any value in a range between 1 and 30. In some embodiments, the quantity of outer spline 342 teeth may be greater than 30. In some embodiments, it may be critical that the quantity of outer spline 342 teeth is greater than 21 to provide sufficient rotational positions for installation of the sleeve 320.

In some embodiments, the outer splines include an outer tooth density. The outer tooth density may be a number of teeth per inch of radius of the outer splines. In some embodiments, the outer tooth density may be in a range having an upper value, a lower value, or upper and lower values including any of 5 per in. radius, 6 per in. radius, 7 per in. radius, 8 per in. radius, 9 per in. radius, 10 per in. radius, 11 per in. radius, 12 per in. radius, 13 per in. radius, 14 per in. radius, 15 per in. radius, 16 per in. radius, 17 per in. radius, 18 per in. radius, 19 per in. radius, 20 per in. radius, 21 per in. radius, 22 per in. radius, 23 per in. radius, 24 per in. radius, 25 per in. radius, or any value therebetween. For example, the outer tooth density may be greater than 5 per in. radius. In another example, the outer tooth density may be less than 25 per in. radius. In yet other examples, the outer tooth density may be any value in a range between 5 and 25 per in. radius. In some embodiments, it may be critical that the outer tooth density is between 10 and 12 per in. radius to provide sufficient rotational positions for installation of the sleeve 320. In at least one embodiment, increasing the number of splines on the sleeve 320, the housing, and the drive shaft may increase the number of engaged splines upon application of a torque load. This may help to share the torque load between the threaded connection between the drive shaft and the housing, the splines, and the shoulders between the first housing, the second housing, and the drive shaft.

In some embodiments, the quantity of inner spline teeth is different from the quantity of inner spline teeth. Similarly, the inner tooth density may be different from the outer tooth density. For example, the quantity of inner spline teeth may be smaller than the quantity of outer spline teeth. In other words, the inner splines may include fewer inner spline teeth than the outer splines have outer spline teeth. In some examples, the quantity of inner spline teeth may be greater than the quantity of outer spline teeth. In other words, the inner splines may include more inner spline teeth than the outer splines have outer spline teeth.

The teeth difference is the difference between the quantity of inner spline teeth and the quantity of outer spline teeth. In some embodiments, the teeth difference may be in a range having an upper value, a lower value, or upper and lower values including any of −10, −5, −4, −3, −2, −1, 1, 2, 3, 4, 5, 10, or any value therebetween. For example, the teeth difference may be greater than −10. In another example, the teeth difference may be less than 10. In yet other examples, the teeth difference may be any value in a range between −10 and 10. In some embodiments, it may be critical that the teeth difference is non-zero to ensure that the sleeve may simultaneously interlock with both the drive shaft and the housing.

In some embodiments, a tooth ratio is the teeth difference divided by quantity of inner spline teeth. In some embodiments, the tooth ratio may be 0.05, 0.1, 0.15, 0.2, 0.25, 0.3, 0.35, 0.4, 0.45, 0.5, or any value therebetween.

In some embodiments, to install the sleeve 320 on both the drive shaft (e.g., drive shaft 214 of FIG. 2-1) and the housing (e.g., housing 216 of FIG. 2-1), the sleeve 320 may be rotated until both the inner splines 328 interlock with the shaft splines (e.g., shaft splines 232 of FIG. 2-2) and the outer splines 330 interlock with the housing splines (e.g., housing splines 234 of FIG. 2-2). Because the drive shaft is connected to the housing with a threaded connection, the rotational position of the drive shaft is determined by the extent of rotation on the threaded connection. Thus, the rotational position of the drive shaft relative to the housing may be variable, depending on many factors, including manufacturing tolerances and installation conditions. Because the rotational position of the drive shaft relative to the housing may be unknown prior to their physical connection, at least one embodiment of the present disclosure may make it easier to interlock the splines of the sleeve 320 with the splines of the drive shaft and the housing.

By including a different number of inner spline teeth 340 and outer spline teeth 342, the sleeve 320 may include many different interlocking rotational positions. An interlocking rotational position may be a rotational alignment of one or both of the inner spline teeth 340 and the outer spline teeth 342. Rotating the sleeve 320 by a single interlocking rotational position may interlock one or both of the inner splines 328 with the shaft splines or the outer splines 330 with the housing splines. Increasing the number of interlocking rotational positions may increase the number of possible rotational alignments between the drive shaft and the housing at which the sleeve 320 may align and interlock (e.g., an outer spline tooth is inserted into a groove between housing spline teeth, and an inner spline tooth is inserted into a groove between drive shaft teeth) with both the shaft splines and the housing splines. Increasing the number of interlocking rotational positions may increase the ease of installation.

In some embodiments, the number of interlocking rotational positions may be quantity of outer spline teeth multiplied by the quantity of inner spline teeth. For example, if the quantity of outer spline teeth is 21 and the quantity of inner spline teeth is 20, then the number of interlocking rotational positions is 420. In other examples, if the quantity of outer spline teeth is 25 and the quantity of inner spline teeth is 23, then the number of interlocking rotational positions is 575. In some embodiments, the number of interlocking rotational positions may be in a range having an upper value, a lower value, or upper and lower values including any of 24, 50, 100, 150, 200, 250, 300, 350, 400, 450, 500, 550, 600, 650, 700, 750, 1,000, or any value therebetween. For example, the number of interlocking rotational positions may be greater than 24. In another example, the number of interlocking rotational positions may be less than 1,000. In yet other examples, the number of interlocking rotational positions may be any value in a range between 24 and 1,000. In some embodiments, it may be critical that the number of interlocking rotational positions is greater than 400 to provide sufficient rotational positions to install the sleeve. In some embodiments, the quantity of inner spline teeth and the quantity of outer spline teeth may not include any common factors. For example, an quantity of inner spline teeth of 20 has factors of 2, 4, 5, and 10. An quantity of outer spline teeth of 21 has factors of 3 and 7. Because 20 and 21 have all different factors, there are no common factors between 20 and 21. Common factors of the quantity of inner spline teeth and the quantity of outer spline teeth may reduce the number of interlocking rotational positions.

The angular difference between individual interlocking rotational positions is the number of degrees the sleeve is rotated between adjacent interlocking rotational positions. For example, if the number of interlocking rotational positions is 420, then the angular difference is 0.86°. Similarly, if the number of interlocking rotational positions is 575, then the angular difference is 0.63°. In some embodiments, the angular difference may be in a range having an upper value, a lower value, or upper and lower values including any of 0.30°, 0.40°, 0.50°, 0.60°, 0.65°, 0.70°, 0.75°, 0.80°, 0.85°, 0.90°, 0.95°, 1.00°, 1.1°, 1.2°, 1.3°, 1.4°, 1.5°, 1.75°, 2.0°, 2.5°, 3.0°, 3.5° 4.0°, 5.0°, 7.5° 10.0°, 12.5°, 15.0°, or any value therebetween. For example, the angular difference may be greater than 0.30°. In another example, the angular difference may be less than 15.0°. In yet other examples, the angular difference may be any value in a range between 0.30° and 15.0°. In some embodiments, it may be critical that the angular difference is less than 1.0° to provide sufficient rotational positions to install the sleeve.

The outer spline teeth 342 have an outer tooth width 343, an outer tooth depth 345, and an outer groove width 347. In some embodiments, the outer tooth width 343 may be the same as the outer groove width 347. In some embodiments, the outer tooth width 343 may be different from the outer groove width 347. The inner spline teeth 340 have an inner tooth width 349, an inner tooth depth 353, and an inner tooth groove width 351. In some embodiments, the inner tooth width 349 may be the same as the inner tooth groove width 351. In some embodiments, the inner tooth width 349 may be different from the inner tooth groove width 351.

Figures 1, 4:
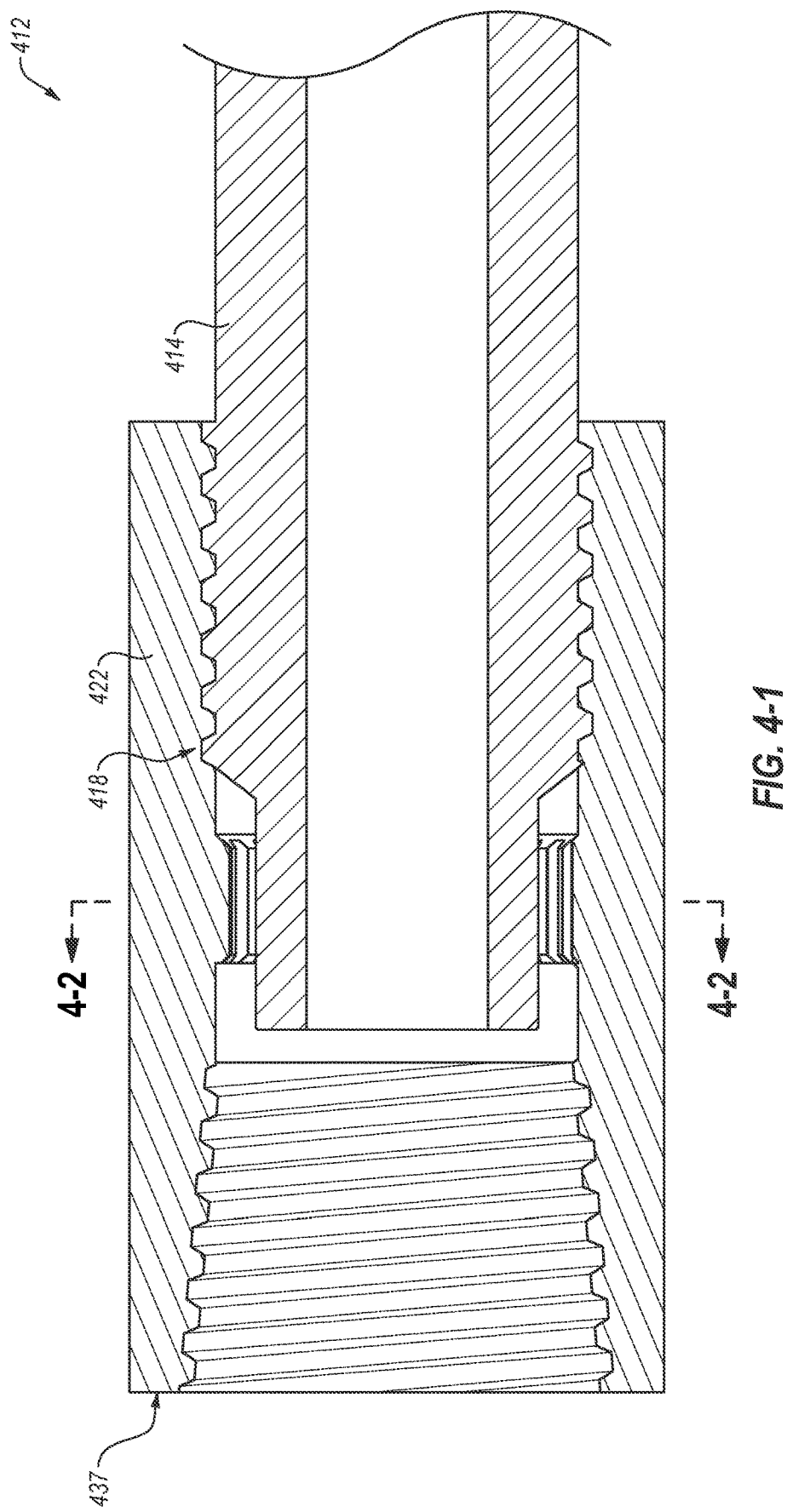
Figures 2, 4:
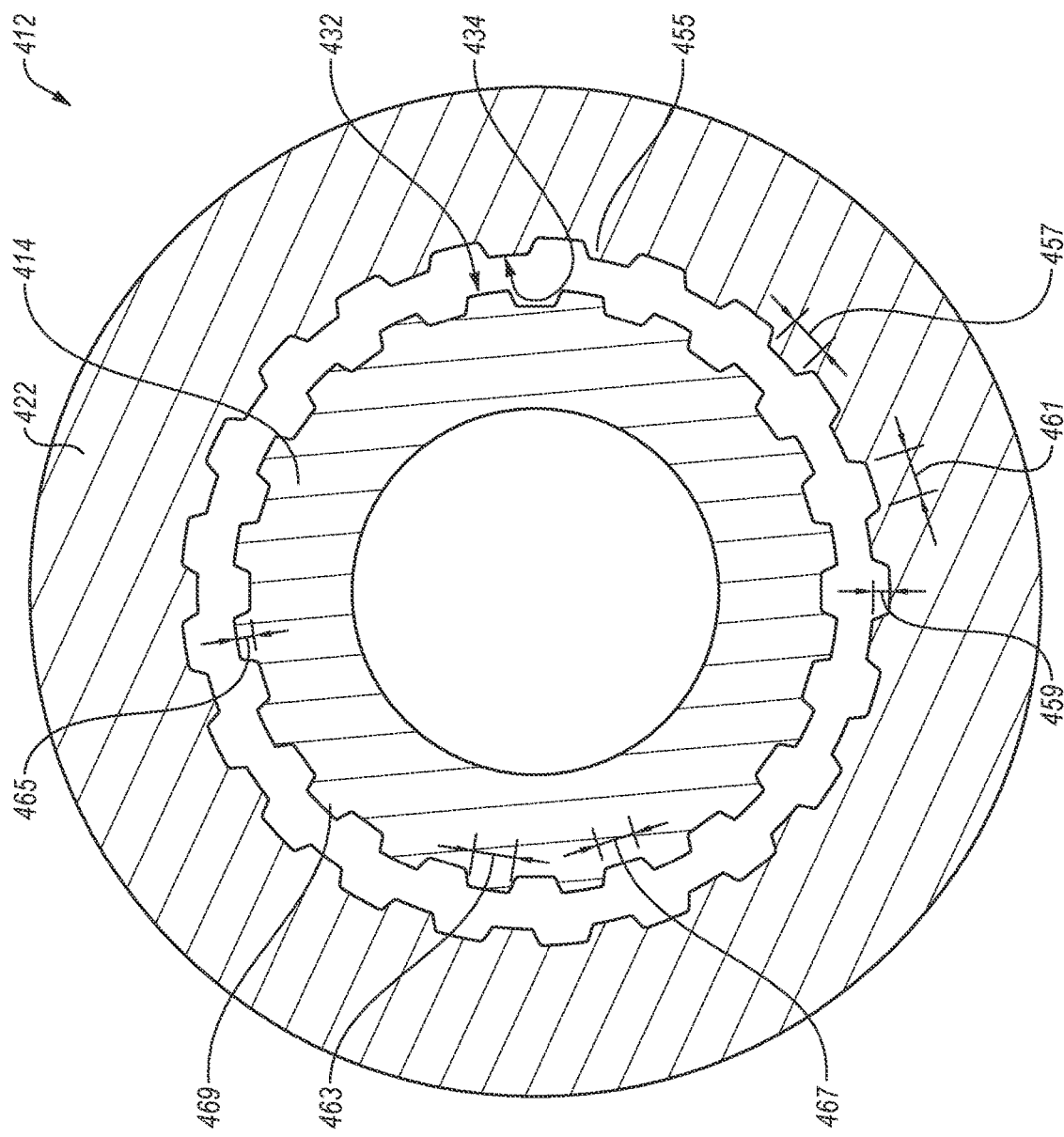

FIG. 4-1 is a representation of a partially assembled torque transfer system 412, according to at least one embodiment of the present disclosure. In the embodiment shown, a drive shaft 414 has been threaded into a first housing 422 with the threaded connection 418. Thus, the partially assembled torque transfer system 412 may be ready for a sleeve (e.g., sleeve 220 of FIG. 2-1) to be inserted into the second end 437 of the first housing 422.

FIG. 4-2 is a transverse cross-sectional view of the partially assembled torque transfer system 412 of FIG. 4-1 from line 11. In the view shown, the drive shaft 414 has been installed at a rotational alignment relative to the first housing 422. Thus, the shaft splines 432 are installed at a relative rotational alignment with respect to housing splines 434. To install a sleeve (e.g., sleeve 320 of FIG. 3) into the torque transfer system 412, the sleeve may be rotated until the rotational alignment of the sleeve allows the inner splines (e.g., inner splines 328 of FIG. 3) to interlock with the shaft splines 432 and the outer splines (e.g., outer splines 330 of FIG. 3) to interlock with the housing splines 434. Furthermore, as may be seen, the shaft splines 432 may at least partially longitudinally overlap with the housing splines 434.

When installing the torque transfer system 412, the drive shaft 414 may be installed in the first housing 422 until the drive shaft 414 has reached a desired longitudinal location. The sleeve may include sufficient interlocking rotational positions to interlock simultaneously with both the shaft splines 432 and the housing splines 434.

The housing splines 434 include housing teeth 455. The housing teeth 455 include a housing tooth width 457, a housing tooth depth 459, and a housing groove width 461. In some embodiments, the housing tooth width 457 may be the same as the housing groove width 461. In some embodiments, the housing tooth width 457 may be different than the housing groove width 461. In some embodiments, to interlock the outer splines with the housing splines 434, the outer spline teeth 342 may be inserted into the gaps between the housing teeth 455. In some embodiments, the outer tooth width (e.g., outer tooth width 343 of FIG. 3) of the outer splines may be the same as the housing groove width 461. In some embodiments, the outer tooth width may be smaller than the housing groove width 461. Similarly, the housing tooth width 457 may be the same as or less than the outer tooth gap width (e.g., outer groove width 347 of FIG. 3). In some embodiments, the outer tooth depth (e.g., outer tooth depth 345) may be the same as the housing tooth depth 459.

In some embodiments, the outer tooth depth may be different from the housing tooth depth 459.

The shaft splines 432 include shaft teeth 469. The shaft teeth 469 include a shaft tooth width 463, a shaft tooth depth 465, and a shaft groove width 467. In some embodiments, the shaft tooth width 463 may be the same as the shaft groove width 467. In some embodiments, the shaft tooth width 463 may be different than the shaft groove width 467. In some embodiments, to interlock the inner splines with the shaft splines 432, the inner spline teeth may be inserted into the gaps between the shaft teeth 469. In some embodiments, the inner tooth width (e.g., inner tooth width 349 of FIG. 3) of the inner splines may be the same as the shaft groove width 467. In some embodiments, the inner tooth width may be smaller than the shaft groove width 467. Similarly, the shaft tooth width 463 may be the same as or less than the inner groove width (e.g., inner groove width 351 of FIG. 3). In some embodiments, the inner tooth depth (e.g., inner tooth depth 353) may be the same as the shaft tooth depth 465. In some embodiments, the inner tooth depth may be different from the shaft tooth depth 465.

In some embodiments, the relationship between the teeth on the sleeve and the teeth on the first housing 422 and/or the drive shaft 414 may determine the efficiency and/or wear of the torque transfer system 412. For example, if the inner tooth width is less than the shaft groove width 467, then the sleeve may shift during operation. This may change the efficiency of the torque transfer system 412 and/or change the wear of the torque transfer system.

Figure 5:
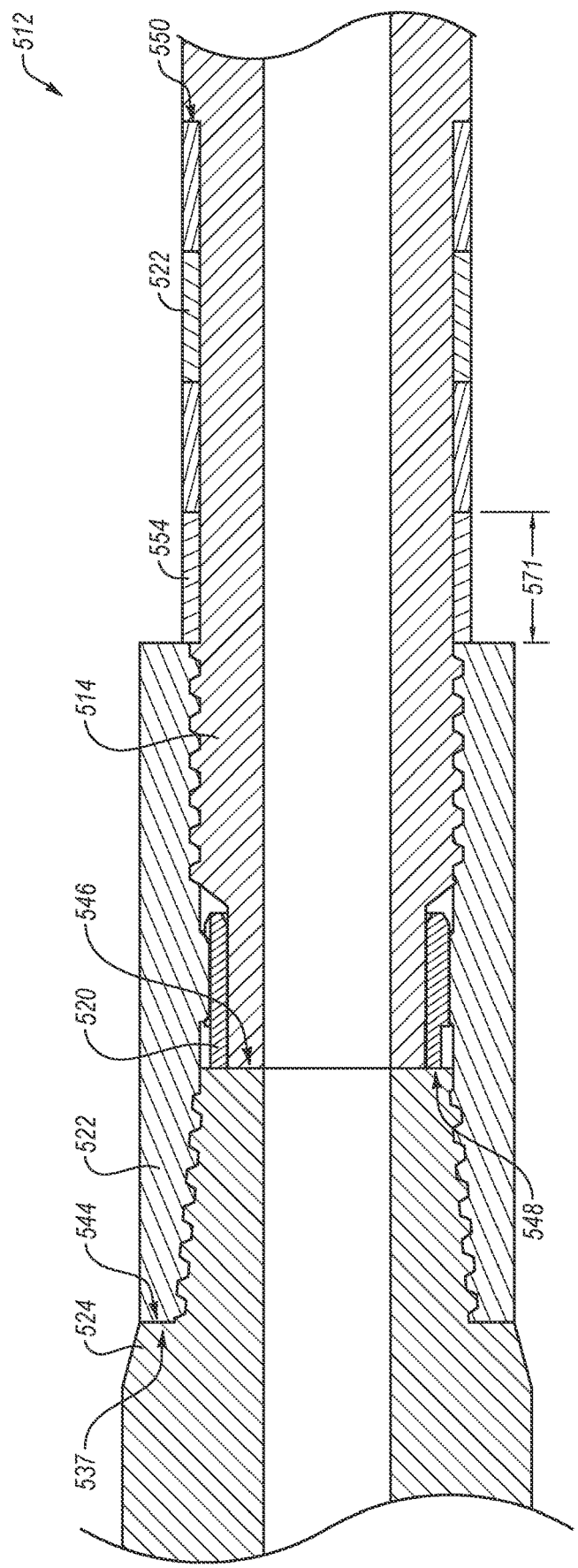
FIG. 5 is a representation of a cross-sectional view of a torque transfer system, according to at least one embodiment of the present disclosure.

FIG. 5 is a representation of an assembled torque transfer system 512, according to at least one embodiment of the present disclosure. As may be seen, the drive shaft 514 has been threaded into the first housing 522. The sleeve 520 has been aligned and installed to interlock with the shaft splines and the housing splines. The second housing 524 has been threaded onto the first housing 522 to complete the assembly of the torque transfer system 512.

In the embodiment shown, the second housing 524 includes a housing shoulder 544 and a shaft shoulder 546. When the second housing 524 is threaded onto the first housing 522, the second end 537 of the first housing may contact the housing shoulder 544. Furthermore, when the second housing 524 is threaded onto the first housing 522, a housing end 548 of the drive shaft 514 may contact the shaft shoulder 546. Because the second housing 524 includes two shoulder contacts, the engagement of the housing shoulder 544 and the shaft shoulder 546 may further increase the torque capacity of the torque transfer system. Conventionally, a shaft spacer is placed between the housing end 548 and the shaft shoulder 546 of a single, unitary housing. This shaft spacer may make up the difference in length between the drive shaft 514 and the shaft shoulder 546. By removing this conventional shaft spacer, the connection between the second housing 524, the first housing 522, and the drive shaft 514 may include the contact with the two shoulders, which may increase the torque capacity of the torque transfer system.

To longitudinally place the drive shaft 514 in the interlocking location, the drive shaft 514 may be installed into the first housing 522 while the first housing 522 is connected to the second housing 524. In this manner, the drive shaft 514 may be installed until the housing end 546 contacts the shaft shoulder 546. Then, to install the sleeve 520, the second housing 524 may be removed from the first housing 522, and the sleeve 520 inserted and rotated until the sleeve 520 interlocks with the shaft splines and the housing splines. The second housing 524 may then be installed back onto the first housing 522 and tightened to the desired torque. By removing the conventional shaft spacer, the torque capacity of the connection between the first housing 522, the second housing 524, and the drive shaft 514 may be increased, and the complexity of installation may be reduced. This is because the depth of insertion of the drive shaft 514 into the housing does not have to be measured, and the shaft spacer machined to the desired size. This may make assembly of the torque transfer system 512 easier and faster.

The drive shaft 514 includes a downhole shaft shoulder 550. One or more bearings 552 may be installed around the drive shaft 514 between the downhole shaft shoulder 550 and the first housing 522. The drive shaft 514 may be placed in tension between the downhole shaft shoulder 546 and the second housing 524. To place the drive shaft in tension, the second housing 524 may be tightened onto the first housing 522. This may cause the shaft shoulder 546 to push against the drive shaft 514 at the housing end 548, and the first housing 522 to push against the bearings 552. To make up the distance between the first housing 522 and the bearings 552, a spacer 554 may be installed next to the first housing and the bearings.

In some embodiments, the spacer 554 may be machined to reduce the length 571 of the spacer 554. By reducing the length 571 of the spacer 554, the tension on the drive shaft 514 may be adjusted without adjusting the length of the bearings 552 and/or the drive shaft 514. This may increase the ease with which the drive shaft 514 is installed and tensioned, because it reduces the amount of measuring and machining of internal shaft spacers in the space between the housing end 548 and the downhole shaft shoulder 550.

Figure 6:
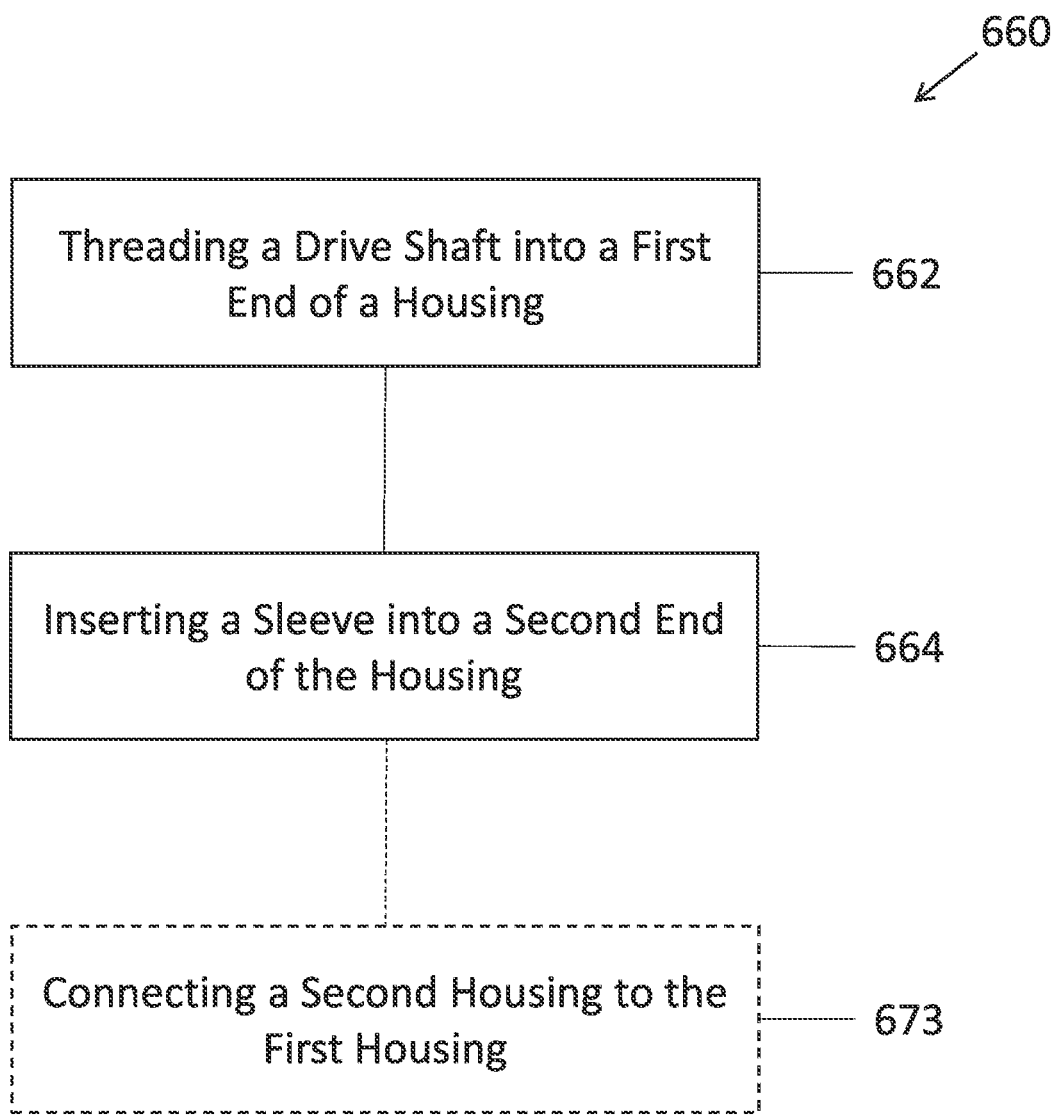
FIG. 6 is a representation of a method for manufacturing a torque transfer system, according to at least one embodiment of the present disclosure.

FIG. 6 is a representation of a method 660 for manufacturing a torque transfer system, according to at least one embodiment of the present disclosure. The method 660 may include threading a drive shaft onto a first end of a housing at 662. A sleeve may be inserted into a second end of the housing at 664. The sleeve may include an inner spline and an outer spline. The inner splines may interlock with a shaft spline on the drive shaft and the outer splines may interlock with a housing spline on the housing. In some embodiments, a second housing may be connected to a first housing when the drive shaft is threaded into the first housing. In other words, the method 660 may include placing the drive shaft in a longitudinal position by threading the drive shaft into a housing, the housing including a first housing threaded onto a second housing, and the second housing including a shaft shoulder. The drive shaft may be threaded into the first housing until a housing end of the drive shaft contacts the shaft shoulder. The method 660 may then include removing the second housing from the first housing, while retaining the longitudinal position of the drive shaft. The sleeve may then be inserted and rotated until the sleeve interlocks with the shaft splines and the housing splines. The method 660 may then include threading the second housing back onto the first housing.

Figure 7:
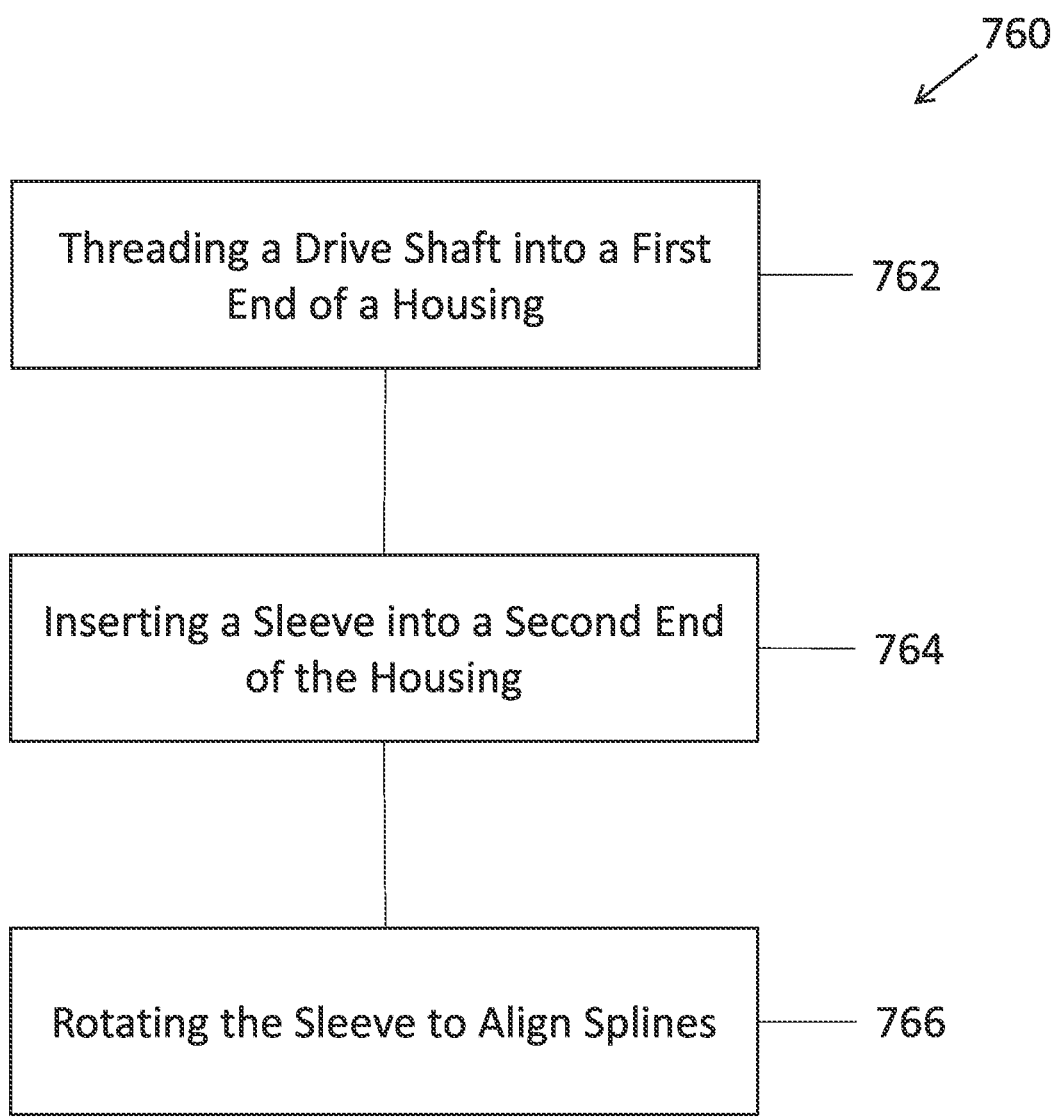
FIG. 7 is a representation of another method for manufacturing a torque transfer system, according to at least one embodiment of the present disclosure.

FIG. 7 is a representation of a method 760 for manufacturing a torque transfer system, according to at least one embodiment of the present disclosure. The method 760 may include threading a drive shaft onto a first end of a housing at 762. The housing may include a first housing threaded onto a second housing. The drive shaft may be threaded into the first housing until a housing end of the drive shaft contacts a shaft shoulder of the second housing. The second housing may then be removed from the first housing. A sleeve may be inserted into a second end of the housing at 764. The sleeve may include an inner spline and an outer spline. The inner splines may interlock with a shaft spline on the drive shaft and the outer splines may interlock with a housing spline on the housing. In some embodiments, inserting the sleeve into the housing may include rotating the sleeve such that both the inner splines interlocks with the shaft spline and the outer splines interlocks with the housing spline at 766. The sleeve may include over 24 interlocking rotational positions, where an interlocking position is one in which at least one of the inner splines interlocks with the shaft spline or the outer splines interlocks with the housing spline. In some embodiments, the sleeve may be inserted into the housing after the drive shaft is threaded into the first end of the housing and the second housing has been removed.

In some embodiments, the housing may include a first housing. The method may further include threading a second housing onto the first housing after the sleeve has been inserted into the first housing. Furthermore, threading the second housing to the first housing may tension the drive shaft. In some embodiments, to place the assembly with a desired tension, with every piece in the appropriate location, material of the spacer may be removed, based on the longitudinal position of the drive shaft relative to the housing.

INDUSTRIAL APPLICABILITY

In some embodiments, a torque transfer system is configured to transfer torque to a drive shaft. The torque transfer system may include a housing, a shaft, and a sleeve. The shaft may include shaft splines on an outer surface of the shaft, the housing may include housing splines on an inner surface of the housing, and the sleeve may include inner splines on an inner surface of the sleeve and outer splines on an outer surface of the sleeve. The sleeve may be configured to interlock with both the shaft splines and the housing splines. Splines provide a strong resistance to torque. Therefore, by connecting the drive shaft to the housing with the sleeve, the torsional resistance of the torque transfer system may be increased. This may allow a greater torque to be applied to the drive shaft. The drive shaft may be connected to a drill bit. Increasing the torque transferred to the drive shaft may increase the torque applied by the drill bit to the formation, which may increase the rate of penetration of the drilling assembly.

The housing of the torque transfer system may be connected to a constant velocity (CV) joint. For example, the housing may be rotated by a mud motor, such as a positive displacement motor (PDM). The output shaft of a PDM may rotate eccentrically, and the CV joint may transfer that eccentric rotation to the housing. Conventionally, the housing is connected to the drive shaft with a threaded connection. A threaded connection is relatively strong in compression and/or tension. However, a threaded connection may have a relatively lower strength in torque. Thus, a threaded connection between the housing and the drive shaft may be relatively weak in torque.

A splined connection may be strong in torque, but weak in compression/tension. By combining a splined connection with a threaded connection, the connection between the housing may be strong in both compression/tension and torque. This may improve the performance of the torque transfer system, which may decrease costs and/or increase rate of penetration.

In some embodiments, the torque transfer system may include a drive shaft. In some embodiments, the drive shaft may be connected to a drill bit. In some embodiments, the drive shaft may be connected to any element (e.g., downhole tool) downhole of the mud motor, such as an MWD, an RSS, a reamer, a mill, any other downhole tool, and combinations thereof. In some embodiments, the drive shaft may be hollow, and include a bore through which drilling fluid may travel. This drilling fluid may be used to actuate downhole components, cool cutting elements on downhole cutting tools, flush away cuttings/swarf, perform any other downhole function, and combinations thereof.

In some embodiments, the drive shaft may include shaft threads. The drive shaft may be configured to connect to a housing via the shaft threads. In some embodiments, the drive shaft may include shaft splines. In some embodiments, the shaft splines may be located uphole of the shaft threads. In other words, in some embodiments, the shaft splines may be located closer to an uphole end of the drive shaft than the shaft threads. In some embodiments, the shaft splines may be located at the uphole end of the drive shaft. In some embodiments, locating the shaft splines at the uphole end of the drive shaft may allow the uphole end of the shaft splines to be machined away to reach an intended length of the shaft. In some embodiments, the shaft threads may be located closer to the uphole end of the drive shaft than the shaft splines.

In some embodiments, the housing may include housing threads. The housing threads may be configured to couple with the shaft threads. This may provide a connection between the drive shaft and the housing that is strong in compression and/or tension. The housing may further include housing splines. The housing splines may be located in a corresponding longitudinal position on the housing as the shaft splines on the drive shaft. In other words, when the housing is connected to the drive shaft by the threaded connection, the housing splines may at least partially align and/or interlock with the shaft splines.

In some embodiments, the sleeve may include inner splines and outer splines. The inner splines may be configured to interlock with the shaft splines on the drive shaft. In some embodiments, the shaft splines may be protrusions from the outer surface of the drive shaft. In some embodiments, the shaft splines may be cast into the drive shaft, the drive shaft may be extruded with the shaft splines, the drive shaft may be additively manufactured with the shaft splines, and combinations thereof. The shaft splines may be parallel to the longitudinal axis of the torque transfer system. In some embodiments, the shaft splines may be formed by machining grooves into the outer surface of the drive shaft, and the shaft splines may be the protruding material between the machined grooves. In some embodiments, to interlock the inner splines with the shaft splines, the protruding teeth of the inner splines may extend into the groove between teeth of the shaft splines, and the protruding teeth of the shaft splines may extend into the groove between protruding teeth of the inner splines. Thus, as the sleeve rotates, the protruding teeth of the shaft splines may contact the protruding teeth of the inner splines, and the protruding teeth of the inner splines may contact the protruding teeth of the shaft splines.

The outer splines may be configured to interlock with a set of housing splines on the first housing. In some embodiments, the housing splines may be protrusions from the inner surface of the first housing. In some embodiments, the housing splines may be formed by machining grooves into the inner surface of the first housing, and the housing splines may be the protruding material between the machined grooves. In some embodiments, the housing splines may be cast into the first housing, the first housing may be extruded with the housing splines, the first housing may be additively manufactured with the housing splines, and combinations thereof. The housing splines may be parallel to the longitudinal axis of the torque transfer system. In some embodiments, to interlock the outer splines with the housing splines, the protruding teeth of the outer splines may extend into the groove between teeth of the housing splines, and the protruding teeth of the housing splines may extend into the groove between protruding teeth of the outer splines. Thus, as the sleeve rotates, the protruding teeth of the housing splines may contact the protruding teeth of the outer splines, and the protruding teeth of the outer splines may contact the protruding teeth of the housing splines.

In some embodiments, the sleeve may be configured to rotationally connect the drive shaft to the housing. In other words, the inner splines may connect to the shaft splines at the same time that the outer splines connect to the housing splines. In this manner, as the housing is rotated, the housing splines may apply a torque to the sleeve via the outer splines. The inner splines may then apply the torque to the drive shaft via the shaft splines. In some embodiments, at least a portion of the torque may be transferred to the drive shaft by the threaded connection between the housing and the drive shaft.

The splines of the sleeve include teeth. Thus, the inner splines include a quantity of inner spline teeth and the outer splines include a quantity of outer spline teeth. The shaft splines include a quantity of shaft spline teeth and the housing splines include a quantity of housing spline teeth. In some embodiments, the quantity of inner spline teeth is the same as the quantity of shaft spline teeth. In some embodiments, the width of the inner spline teeth is the same as the width of the gap between the shaft spline teeth. In some embodiments, the width of the shaft spline teeth is the same as the width of the gap between the inner spline teeth. In some embodiments, the quantity of outer spline teeth is the same as the quantity of housing spline teeth. In some embodiments, the width of the outer spline teeth is the same as the width of the gap between the housing spline teeth. In some embodiments, the width of the housing spline teeth is the same as the width of the gap between the outer spline teeth.

In some embodiments, the quantity of inner spline teeth is different from the quantity of outer spline teeth. For example, the quantity of inner spline teeth may be smaller than the quantity of outer spline teeth. In other words, the inner splines may include fewer inner spline teeth than the outer splines have outer spline teeth. In some examples, the quantity of inner spline teeth may be greater than the quantity of outer spline teeth. In other words, the inner splines may include more inner spline teeth than the outer spline has outer spline teeth.

In some embodiments, the quantity of inner spline teeth may be in a range having an upper value, a lower value, or upper and lower values including any of 1, 2, 3, 4, 5, 6, 7, 8, 9, 10, 12, 14, 16, 18, 20, 25, 30, or any value therebetween. For example, the quantity of inner spline teeth may be greater than 1. In another example, the quantity of inner spline teeth may be less than 30. In yet other examples, the quantity of inner spline teeth may be any value in a range between 1 and 30. In some embodiments, the quantity of inner spline teeth may be greater than 30. In some embodiments, it may be critical that the quantity of inner spline teeth is greater than 20 to provide sufficient rotational positions for installation of the sleeve.

In some embodiments, the inner splines may include inner tooth density. The inner tooth density may be a number of teeth per inch of radius of the inner splines. In some embodiments, the inner tooth density may be in a range having an upper value, a lower value, or upper and lower values including any of 5 per in. radius, 6 per in. radius, 7 per in. radius, 8 per in. radius, 9 per in. radius, 10 per in. radius, 11 per in. radius, 12 per in. radius, 13 per in. radius, 14 per in. radius, 15 per in. radius, 16 per in. radius, 17 per in. radius, 18 per in. radius, 19 per in. radius, 20 per in. radius, 21 per in. radius, 22 per in. radius, 23 per in. radius, 24 per in. radius, 25 per in. radius, or any value therebetween. For example, the inner tooth density may be greater than 5 per in. radius. In another example, the inner tooth density may be less than 25 per in. radius. In yet other examples, the inner tooth density may be any value in a range between 5 and 25 per in. radius. In some embodiments, it may be critical that the inner tooth density is between 10 and 12 per in. radius to provide sufficient rotational positions for installation of the sleeve 320.

In some embodiments, the quantity of outer spline teeth may be in a range having an upper value, a lower value, or upper and lower values including any of 1, 2, 3, 4, 5, 6, 7, 8, 9, 10, 12, 14, 16, 18, 20, 21, 25, 30, or any value therebetween. For example, the quantity of outer spline teeth may be greater than 1. In another example, the quantity of outer spline teeth may be less than 30. In yet other examples, the quantity of outer spline teeth may be any value in a range between 1 and 30. In some embodiments, the quantity of outer spline teeth may be greater than 30. In some embodiments, it may be critical that the quantity of outer spline teeth is greater than 21 to provide sufficient rotational positions for installation of the sleeve.

In some embodiments, the outer splines may include outer tooth density. The outer tooth density may be a number of teeth per inch of radius of the outer splines. In some embodiments, the outer tooth density may be in a range having an upper value, a lower value, or upper and lower values including any of 5 per in. radius, 6 per in. radius, 7 per in. radius, 8 per in. radius, 9 per in. radius, 10 per in. radius, 11 per in. radius, 12 per in. radius, 13 per in. radius, 14 per in. radius, 15 per in. radius, 16 per in. radius, 17 per in. radius, 18 per in. radius, 19 per in. radius, 20 per in. radius, 21 per in. radius, 22 per in. radius, 23 per in. radius, 24 per in. radius, 25 per in. radius, or any value therebetween. For example, the outer tooth density may be greater than 5 per in. radius. In another example, the outer tooth density may be less than 25 per in. radius. In yet other examples, the outer tooth density may be any value in a range between 5 and 25 per in. radius. In some embodiments, it may be critical that the outer tooth density is between 10 and 12 per in. radius to provide sufficient rotational positions for installation of the sleeve 320. In at least one embodiment, increasing the number of splines on the sleeve 320, the housing, and the drive shaft may increase the number of engaged splines upon application of a torque load. This may help to share the torque load between the threaded connection between the drive shaft and the housing, the splines, and the shoulders between the first housing, the second housing, and the drive shaft.

The teeth difference is the difference between the quantity of inner spline teeth and the quantity of outer spline teeth. In some embodiments, the teeth difference may be in a range having an upper value, a lower value, or upper and lower values including any of −10, −5, −4, −3, −2, −1, 1, 2, 3, 4, 5, 10, or any value therebetween. For example, the teeth difference may be greater than −10. In another example, the teeth difference may be less than 10. In yet other examples, the teeth difference may be any value in a range between −10 and 10. In some embodiments, it may be critical that the teeth difference is non-zero to ensure that the sleeve may simultaneously interlock with both the drive shaft and the housing.

In some embodiments, a tooth ratio is the teeth difference divided by inner splines number of teeth. In some embodiments, the tooth ratio may be 0.05, 0.1, 0.15, 0.2, 0.25, 0.3, 0.35, 0.4, 0.45, 0.5, or any value therebetween.

In some embodiments, to install the sleeve on both the drive shaft and the housing, the sleeve may be rotated until both the inner splines interlock with the shaft splines and the outer splines interlock with the housing splines. Because the drive shaft is connected to the housing with a threaded connection, the rotational position of the drive shaft is determined by the extent of rotation on the threaded connection. Thus, the rotational position may be variable, depending on many factors, including manufacturing tolerances and installation conditions. Because the rotational position of the drive shaft relative to the housing may be unknown prior to their physical connection, it may be difficult to place the drive shaft in a predictable and reproducible rotational position. Thus, it may be difficult to place the shaft splines and the housing splines in a predictable and reproducible rotational alignment. This may make it difficult to install the sleeve.

By including a different number of inner spline teeth and outer spline teeth, the sleeve may include many different interlocking rotational positions. An interlocking rotational position may be a rotational alignment of the inner spline teeth and the outer spline teeth. Rotating the sleeve by a single interlocking rotational position may interlock one or both of the inner splines with the shaft splines or the outer splines with the housing splines. Increasing the number of interlocking rotational positions may increase the number of possible rotational alignments between the drive shaft and the housing at which the sleeve may align and interlock with both the shaft splines and the housing splines. Increasing the number of interlocking rotational positions may increase the ease of installation.

In some embodiments, the number of interlocking rotational positions may be quantity of outer spline teeth multiplied by the quantity of inner spline teeth. For example, if the quantity of outer spline teeth is 21 and the quantity of inner spline teeth is 20, then the number of interlocking rotational positions is 420. In other examples, if the quantity of outer spline teeth is 25 and the quantity of inner spline teeth is 23, then the number of interlocking rotational positions is 575. In some embodiments, the number of interlocking rotational positions may be in a range having an upper value, a lower value, or upper and lower values including any of 24, 50, 100, 150, 200, 250, 300, 350, 400, 450, 500, 550, 600, 650, 700, 750, 1,000, or any value therebetween. For example, the number of interlocking rotational positions may be greater than 24. In another example, the number of interlocking rotational positions may be less than 1,000. In yet other examples, the number of interlocking rotational positions may be any value in a range between 24 and 1,000. In some embodiments, it may be critical that the number of interlocking rotational positions is greater than 400 to provide sufficient rotational positions to install the sleeve. In some embodiments, the quantity of inner spline teeth and the quantity of outer spline teeth may not include any common factors. For example, an quantity of inner spline teeth of 20 has factors of 2, 4, 5, and 10. An quantity of outer spline teeth of 21 has factors of 3 and 7. Because 20 and 21 have all different factors, there are no common factors between 20 and 21. Common factors of the quantity of inner spline teeth and the quantity of outer spline teeth may reduce the number of interlocking rotational positions.

The angular difference between individual interlocking rotational positions is the number of degrees the sleeve is rotated between adjacent interlocking rotational positions. For example, if the number of interlocking rotational positions is 420, then the angular difference is 0.86°. Similarly, if the number of interlocking rotational positions is 575, then the angular difference is 0.63°. In some embodiments, the angular difference may be in a range having an upper value, a lower value, or upper and lower values including any of 0.3°, 0.4°, 0.50°, 0.60°, 0.65°, 0.70°, 0.75°, 0.80°, 0.85°, 0.90°, 0.95°, 1.00°, 1.1°, 1.2°, 1.3°, 1.4°, 1.5°, 1.75°, 2.0°, 2.5°, 3.0°, 3.5° 4.0°, 5.0°, 7.5° 10.0°, 12.5°, 15.0°, or any value therebetween. For example, the angular difference may be greater than 0.30°. In another example, the angular difference may be less than 15.0°. In yet other examples, the angular difference may be any value in a range between 0.30 and 15.0°. In some embodiments, it may be critical that the angular difference is less than 1.0° to provide sufficient rotational positions to install the sleeve.

In some embodiments, the sleeve may be in an installation alignment when both the inner splines are aligned and interlocked with the shaft splines and the outer splines are aligned and interlocked with the housing splines. In some embodiments, there may be fewer installation alignments than interlocking rotational alignments. Thus, to install the sleeve, the sleeve may be rotated through multiple interlocking rotational alignments until the installation alignment is found. In some embodiments, the installation alignment may be dependent or based on the rotational alignment of the drive shaft within the threaded connection. In some embodiments, a rotational alignment of the drive shaft within the threaded connection may include a single installation alignment. In some embodiments, a rotational alignment of the drive shaft within the threaded connection may include multiple installation alignments. For example, a rotational alignment of the drive within the threaded connection may include 1, 2, 3, 4, 5, 6, 7, 8, 9, 10, or more installation alignments.

The housing splines include housing teeth. The housing teeth include a housing tooth width, a housing tooth depth, and a housing groove width. In some embodiments, the housing tooth width may be the same as the housing groove width. In some embodiments, the housing tooth width may be different than the housing groove width. In some embodiments, to interlock the outer splines with the housing splines, the outer spline teeth may be inserted into the gaps between the housing teeth. In some embodiments, the outer tooth width of the outer splines may be the same as the housing groove width. In some embodiments, the outer tooth width may be smaller than the housing groove width. Similarly, the housing tooth width may be the same as or less than the outer tooth gap width. In some embodiments, the outer tooth depth may be the same as the housing tooth depth. In some embodiments, the outer tooth depth may be different from the housing tooth depth.

The shaft splines include shaft teeth. The shaft teeth include a shaft tooth width, a shaft tooth depth, and a shaft groove width. In some embodiments, the shaft tooth width may be the same as the shaft groove width. In some embodiments, the shaft tooth width may be different than the shaft groove width. In some embodiments, to interlock the inner splines with the shaft splines, the inner spline teeth may be inserted into the gaps between the shaft teeth. In some embodiments, the inner tooth width of the inner splines may be the same as the shaft groove width. In some embodiments, the inner tooth width may be smaller than the shaft groove width. Similarly, the shaft tooth width may be the same as or less than the inner groove width. In some embodiments, the inner tooth depth may be the same as the shaft tooth depth. In some embodiments, the inner tooth depth may be different from the shaft tooth depth.

In some embodiments, the relationship between the teeth on the sleeve and the teeth on the first housing and/or the drive shaft may determine the efficiency and/or wear of the torque transfer system. For example, if the inner tooth width is less than the shaft groove width, then the sleeve may shift during operation. This may change the efficiency of the torque transfer system and/or change the wear of the torque transfer system.

In some embodiments, increasing the number of teeth in any spline (e.g., the inner splines, the outer splines, the shaft spline, and the housing spline) may decrease the torque strength of the torque transfer connection. However, a smaller number of teeth decreases the number of interlocking rotational positions, which makes finding an installation position less likely. In some embodiments, the balance between reducing the number of teeth and increasing the number of interlocking rotational positions may include determining the optimum width of a tooth. A narrow tooth may bend upon application of a torque load. Furthermore, the strength of the teeth may be related to the tooth depth. A larger tooth depth may increase the bearing area of the tooth but may decrease the bending strength. Thus, the tooth height and width may be calculated at least in part based on the anticipated torque loads. In some embodiments, the tooth depth may be less or equal to the groove width. In some embodiments, the tooth depth may be greater than the groove width.

In some embodiments, the housing may include a first housing and a second housing. The first housing may be a downhole housing or a lower housing (e.g., the first housing may be downhole or lower in a vertical wellbore than the second housing). In some embodiments, the first housing may include the housing spline. In some embodiments, the first housing may include the housing threads, which may be configured to connect to the shaft threads on the drive shaft. Thus, the first housing may be connected to the drive shaft with a threaded connection. Because the first housing includes the housing splines, in some embodiments, the rotational alignment of the first housing relative to the shaft may determine the installation alignment of the sleeve.

In some embodiments, the second housing may be an uphole housing or an upper housing (e.g., the second housing may be uphole or higher in a vertical wellbore than the first housing). In some embodiments, the second housing may be connected to the first housing with a housing threaded connection. In some embodiments, the second housing may include a housing shoulder and a shaft shoulder. When the second housing is threaded onto the first housing, the second end of the second housing may contact the housing shoulder. Furthermore, when the second housing is threaded onto the first housing, a housing end of the drive shaft may contact the shaft shoulder.

The drive shaft may include a downhole shaft shoulder. One or more bearings may be installed around the drive shaft between the downhole shaft shoulder and the first housing. The drive shaft may be placed in tension between the shaft shoulder and the second housing. To place the drive shaft in tension, the second housing may be tightened onto the first housing. The shaft shoulder may push against the drive shaft, and the first housing may push against the bearings. To make up the distance between the first housing and the downhole shaft shoulder, a spacer may be installed next to the first housing and the bearings.

Because the second housing includes two shoulder contacts, the engagement of the housing shoulder and the shaft shoulder may further increase the torque capacity of the torque transfer system. Conventionally, a shaft spacer is placed between the housing end and the shaft shoulder of a single, unitary housing. This shaft spacer may make up the difference in length between the drive shaft and the shaft shoulder. By removing this conventional shaft spacer, the connection between the second housing, the first housing, and the drive shaft may include the contact with the two shoulders, which may increase the torque capacity of the torque transfer system.

To longitudinally place the drive shaft in the interlocking location, the drive shaft may be installed into the first housing while the first housing is connected to the second housing. In this manner, the drive shaft may be installed until the housing end contacts the shaft shoulder. Then, to install the sleeve, the second housing may be removed from the first housing, and the sleeve inserted and rotated until the sleeve interlocks with the shaft splines and the housing splines. The second housing may then be installed back onto the first housing and tightened to the desired torque. By removing the conventional shaft spacer, the torque capacity of the connection between the first housing, the second housing, and the drive shaft may be increased, and the complexity of installation may be reduced. This is because the depth of insertion of the drive shaft into the housing does not have to be measured, and the shaft spacer machined to the desired size. This may make assembly of the torque transfer system easier and faster.

In some embodiments, the spacer may be machined to reduce the length of the spacer. By reducing the length of the spacer, the tension on the drive shaft may be adjusted without adjusting the length of the bearings and/or the drive shaft. This may increase the ease with which the drive shaft is installed and tensioned, because it reduces the amount of measuring and machining of internal shaft spacers in the space between the housing end and the downhole shaft shoulder.

In some embodiments, a method for manufacturing a torque transfer system may include threading a drive shaft onto a first end of a housing. A sleeve may be inserted into a second end of the housing. The sleeve may include an inner spline and an outer spline. The inner splines may interlock with a shaft spline on the drive shaft and the outer splines may interlock with a housing spline on the housing. In some embodiments, a second housing may be connected to a first housing when the drive shaft is threaded into the first housing. In other words, the method 660 may include placing the drive shaft in a longitudinal position by threading the drive shaft into a housing, the housing including a first housing threaded onto a second housing, and the second housing including a shaft shoulder. The drive shaft may be threaded into the first housing until a housing end of the drive shaft contacts the shaft shoulder. The method 660 may then include removing the second housing from the first housing, while retaining the longitudinal position of the drive shaft. The sleeve may then be inserted and rotated until the sleeve interlocks with the shaft splines and the housing splines. The method 660 may then include threading the second housing back onto the first housing.

In some embodiments, inserting the sleeve into the housing may include rotating the sleeve such that both the inner splines interlocks with the shaft spline and the outer splines interlocks with the housing spline. The sleeve may include over 24 interlocking rotational positions, where an interlocking position is one in which at least one of the inner splines interlocks with the shaft spline or the outer splines interlocks with the housing spline. In some embodiments, the sleeve may be inserted into the housing after the drive shaft is threaded into the first end of the housing and the second housing has been removed.

In some embodiments, the housing may include a first housing. The method may further include threading a second housing onto the first housing after the sleeve has been inserted into the first housing. Furthermore, threading the second housing to the first housing may tension the drive shaft. In some embodiments, to place the assembly with a desired tension, with every piece in the appropriate location, material of the spacer may be removed, based on the longitudinal position of the drive shaft relative to the housing.

The embodiments of the torque transfer systems have been primarily described with reference to wellbore drilling operations; the torque transfer systems described herein may be used in applications other than the drilling of a wellbore. In other embodiments, torque transfer systems according to the present disclosure may be used outside a wellbore or other downhole environment used for the exploration or production of natural resources. For instance, torque transfer systems of the present disclosure may be used in a borehole used for placement of utility lines. Accordingly, the terms "wellbore," "borehole" and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly sufficient to encompass values that are at least close sufficient to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A torque transfer system, comprising:
   a drive shaft including a shaft spline and a housing end;
   a first housing including a housing spline, the drive shaft being inserted into a first end of the first housing; and
   a sleeve including an outer spline and an inner spline, wherein the outer splines is configured to interlock with the housing spline and the inner splines is configured to interlock with the shaft spline; and
   a second housing connected to a second end of the first housing with a threaded connection, the second housing comprising a housing shoulder in axial engagement with the second end of the first housing to form a first shoulder contact and a shaft shoulder in axial engagement with the housing end of the drive shaft to form a second shoulder contact.

2. The torque transfer system of claim 1, wherein the sleeve is configured to interlock with the housing spline and the shaft spline at the same time.

3. The torque transfer system of claim 1, wherein the second housing is configured to connect to a CV joint.

4. The torque transfer system of claim 1, wherein the drive shaft is threaded into the first housing with a second threaded connection.

5. The torque transfer system of claim 4, wherein an installation alignment of the sleeve is based on a rotational alignment of the drive shaft within the second threaded connection.

6. The torque transfer system of claim 1, wherein the shaft spline is located closer to the housing end of the drive shaft than a set of shaft threads on the drive shaft.

7. The torque transfer system of claim 1, wherein the sleeve includes greater than 24 rotational alignments between the drive shaft and the first housing at which at least one of the outer splines interlocks with the housing spline and the inner splines interlocks with the shaft spline.

8. A torque transfer system, comprising:
a first housing including a housing spline;
a second housing comprising a housing shoulder, a shaft shoulder, and housing threads axially between the housing shoulder and the shaft shoulder, wherein the housing shoulder is configured to axially engage with an end of the first housing to form a first shoulder contact when the housing threads connect the first housing with the second housing and
a sleeve including an outer spline and an inner spline, the housing spline being configured to interlock with the outer splines, wherein a drive shaft is configured to be inserted into the housing and internal to the sleeve, wherein a housing end of the drive shaft is configured to axially engage with the shaft shoulder of the second housing to form a second shoulder contact.

9. The torque transfer system of claim 8, wherein the outer spline has a quantity of outer spline teeth and the inner spline has a quantity of inner spline teeth, the quantity of outer spline teeth being different from the quantity of inner spline teeth.

10. The torque transfer system of claim 9, wherein the quantity of outer spline teeth is greater than the quantity of inner spline teeth.

11. The torque transfer system of claim 9, wherein the quantity of outer spline teeth does not include a common factor with the quantity of inner spline teeth.

12. A method of manufacturing a torque transfer system, comprising:
threading a drive shaft into a first end of a first housing; and
inserting a sleeve into a second end of the first housing, the sleeve including an inner spline and an outer spline, the inner splines interlocking with a shaft spline on the drive shaft, the outer splines interlocking with a housing spline on the first housing; and
threading a second housing to the second end of the first housing to form a first shoulder contact and a second shoulder contact after inserting the sleeve into the second end, wherein:
the first shoulder contact comprises axial engagement of a housing shoulder of the second housing with the second end of the first housing; and
the second shoulder contact comprises axial engagement of a shaft shoulder of the second housing with a housing end of the drive shaft.

13. The method of claim 12, wherein inserting the sleeve into the first housing includes rotating the sleeve such that the outer splines interlocks with the housing spline and the inner splines interlocks with the shaft spline, the sleeve including over 24 interlocking rotational positions where at least one of the inner splines interlocks with the shaft spline and the outer splines interlocks with the housing spline.

14. The method of claim 12, wherein threading the second housing to the first housing includes tensioning the drive shaft.

15. The method of claim 12, comprising;
inserting a spacer between the first end of the housing and bearings around the drive shaft; and
removing material from a spacer based on a longitudinal position of the spacer relative to the first housing.

16. The method of claim 12, wherein inserting the sleeve into the second end of the first housing occurs after the drive shaft is threaded into the first end of the first housing.

17. The method of claim 12, comprising:
threading the second housing to the second end of the first housing prior to threading the drive shaft into the first end of the first housing;
threading the drive shaft into the first end of the first housing to form the second shoulder contact; and
removing the second housing from the second end of the first housing prior to inserting the sleeve into the second end of the first housing.

* * * * *